United States Patent
Zeng et al.

(10) Patent No.: US 10,607,061 B2
(45) Date of Patent: Mar. 31, 2020

(54) DISPLAY DEVICE, FINGERPRINT RECOGNITION CALIBRATION METHOD FOR DISPLAY DEVICE AND ELECTRONIC APPARATUS

(71) Applicant: SHANGHAI TIANMA MICRO-ELECTRONICS CO., LTD., Shanghai (CN)

(72) Inventors: Yang Zeng, Shanghai (CN); Qing Zhang, Shanghai (CN); Lihua Wang, Shanghai (CN); Liang Xie, Shanghai (CN); Hong Ding, Shanghai (CN); Lingxiao Du, Shanghai (CN); Huiping Chai, Shanghai (CN); Kang Yang, Shanghai (CN); Qijun Yao, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 136 days.

(21) Appl. No.: 15/864,986

(22) Filed: Jan. 8, 2018

(65) Prior Publication Data
US 2018/0137337 A1    May 17, 2018

(30) Foreign Application Priority Data
Oct. 9, 2017    (CN) .......................... 2017 1 0930072

(51) Int. Cl.
*G06K 9/00*    (2006.01)
(52) U.S. Cl.
CPC ..... *G06K 9/00087* (2013.01); *G06K 9/00013* (2013.01)

(58) Field of Classification Search
CPC ....................... G06K 9/00087; G06K 9/00013
See application file for complete search history.

(56) References Cited

U.S. PATENT DOCUMENTS

| | | |
|---|---|---|
| 7,831,070 B1 | 11/2010 | Cheng et al. |
| 2010/0013796 A1 | 1/2010 | Abileah et al. |
| 2015/0346897 A1 | 12/2015 | Irri et al. |

(Continued)

FOREIGN PATENT DOCUMENTS

CN    104992158 A    10/2015

OTHER PUBLICATIONS

German, 1st Office Action dated Jul. 26, 2018.

*Primary Examiner* — John B Strege
(74) *Attorney, Agent, or Firm* — Alston & Bird LLP

(57) ABSTRACT

A display device, a fingerprint recognition calibration method for the display device and an electronic apparatus are disclosed. The fingerprint recognition calibration method includes: for any fingerprint recognition unit, during an initial calibration, displaying a first image by the display panel and acquiring a bright screen calibration fingerprint data by the fingerprint recognition unit and not displaying any image by the display panel and acquiring a dark screen calibration fingerprint data by the fingerprint recognition unit; during a fingerprint recognition, displaying the first image by the display panel and acquiring a bright screen fingerprint data by the fingerprint recognition unit; and performing calibration according to a calibration formula to obtain a calibrated fingerprint recognition data by the fingerprint recognition unit.

17 Claims, 5 Drawing Sheets

During an initial calibration, a display panel displays a first image and a fingerprint recognition unit acquires a bright screen calibration fingerprint data *light'*; and the display panel does not display any image and the fingerprint recognition unit acquires a dark screen calibration fingerprint data *dark'* — 110

During a fingerprint recognition, the display panel displays the first image and the fingerprint recognition unit acquires a bright screen fingerprint data raw — 120

The fingerprint recognition unit performs calibration according to a calibration formula (1) to obtain a calibrated fingerprint recognition data image — 130

(56) References Cited

U.S. PATENT DOCUMENTS

| | | | |
|---|---|---|---|
| 2017/0249494 A1* | 8/2017 | Zhang | G06K 9/00013 |
| 2017/0323138 A1 | 11/2017 | Andersson et al. | |
| 2018/0060643 A1* | 3/2018 | Ding | G06K 9/00053 |
| 2018/0232555 A1* | 8/2018 | Tsao | G06K 9/00087 |
| 2019/0012517 A1* | 1/2019 | Li | G06K 9/00087 |

* cited by examiner

DISPLAY DEVICE, FINGERPRINT RECOGNITION CALIBRATION METHOD FOR DISPLAY DEVICE AND ELECTRONIC APPARATUS

CROSS-REFERENCES TO RELATED APPLICATIONS

This application claims priority to Chinese patent application No. CN201710930072.X, filed on Oct. 9, 2017, the disclosure of which is incorporated herein by reference in its entirety.

TECHNICAL FIELD

Embodiments of the present disclosure relate to display technologies, and, in particular to a display device, a fingerprint recognition calibration method for the display device and an electronic apparatus.

BACKGROUND

A fingerprint of a person is inherent and unique. With the development of technologies, various display devices having a fingerprint recognition function are present on the market. Such devices include mobile phones, tablet PCs, intelligent wearable equipment, etc. In this way, a user can perform permission validation just by touching, by a finger, the fingerprint recognition module of a display device having a fingerprint recognition function before operating this device, thereby simplifying the permission validation process.

In an existing display device with the fingerprint recognition function, each frame of the fingerprint image acquired by the fingerprint recognition module is at least affected by a finger pattern, a display surface pattern and a light leakage of pixel unit, easily causing a low fingerprint recognition accuracy of the fingerprint recognition module.

SUMMARY

Embodiments of the present disclosure provide a display device, a fingerprint recognition calibration method for the display device and an electronic apparatus in order for improving the fingerprint recognition accuracy.

In a first aspect, embodiments of the present disclosure provide a fingerprint recognition calibration method for a display device. The display device includes a display panel, a fingerprint recognition module and a light transmittable film provided between the display panel and the fingerprint recognition module. The fingerprint recognition module includes a plurality of fingerprint recognition units.

The fingerprint recognition calibration method for the display device includes: for anyone of the plurality of fingerprint recognition units, during an initial calibration, displaying a first image by the display panel and acquiring a bright screen calibration fingerprint data light' by the fingerprint recognition unit; and not displaying any image by the display panel and acquiring a dark screen calibration fingerprint data dark' by the fingerprint recognition unit;

during a fingerprint recognition, displaying the first image by the display panel and acquiring a bright screen fingerprint data raw by the fingerprint recognition unit;

performing calibration by the fingerprint recognition unit according to a calibration formula (1) to obtain a calibrated fingerprint recognition data image, $$\text{image} = \frac{\text{raw} - \text{dark1}}{\text{light}' - \text{dark}'}, \quad (1)$$

dark1 is the dark screen calibration fingerprint data dark' acquired by the fingerprint recognition unit when the display panel does not display any image during the initial calibration, or dark1 is a dark screen fingerprint data dark acquired by the fingerprint recognition unit before the display panel displays the first image during the fingerprint recognition.

In a second aspect, embodiments of the present disclosure further provide a fingerprint recognition calibration method for a display device. The display device includes a display panel, a fingerprint recognition module and a light transmittable film provided between the display panel and the fingerprint recognition module. The fingerprint recognition module includes a plurality of fingerprint recognition units.

The fingerprint recognition calibration method for the display panel includes: for any of the plurality of fingerprint recognition units, during an initial calibration, displaying a first image by the display panel and acquiring a reflection calibration fingerprint data light1 by the fingerprint recognition unit; and displaying the first image by the display panel and acquiring a black calibration fingerprint data light2 by the fingerprint recognition unit;

during a fingerprint recognition, displaying the first image by the display panel and acquiring a bright screen fingerprint data raw by the fingerprint recognition unit;

performing calibration by the fingerprint recognition unit according to a calibration formula (2) to obtain a calibrated fingerprint recognition data image, $$\text{image} = \frac{\text{raw} - \text{light2}}{\text{light1} - \text{light2}}. \quad (2)$$

In a third aspect, embodiments of the present disclosure further include a display device. The display device includes a display panel and a fingerprint recognition module. A light transmittable film is provided between the display panel and the fingerprint recognition module. The fingerprint recognition module includes a plurality of fingerprint recognition units.

The display device further includes a fingerprint recognition calibration device. A calibration method of the fingerprint recognition calibration device includes: for any of the plurality of fingerprint recognition units, during an initial calibration, displaying a first image by the display panel and acquiring a bright screen calibration fingerprint data light' by the fingerprint recognition unit; and not displaying any image by the display panel and acquiring a dark screen calibration fingerprint data dark' by the fingerprint recognition unit; during a fingerprint recognition, displaying the first image by the display panel and acquiring a bright screen fingerprint data raw by the fingerprint recognition unit; performing calibration by the fingerprint recognition unit according to a calibration formula (1) to obtain a calibrated fingerprint recognition data image, $$\text{image} = \frac{\text{raw} - \text{dark1}}{\text{light}' - \text{dark}'}, \quad (1)$$

wherein dark1 is a dark screen calibration fingerprint data dark' acquired by the fingerprint recognition unit when the display panel does not display any image during the initial calibration, or dark1 is a dark screen fingerprint data dark acquired by the fingerprint recognition unit before the display panel displays the first image during the fingerprint recognition.

In a fourth aspect, embodiments of the present disclosure further provide a display device. The display device includes a display panel and a fingerprint recognition module. A light transmittable film is provided between the display panel and the fingerprint recognition module. The fingerprint recognition module includes a plurality of fingerprint recognition units.

The display device further includes a fingerprint recognition calibration device. A calibration method of the fingerprint recognition calibration device includes: for any of the plurality of fingerprint recognition units, during an initial calibration, displaying a first image by the display panel and acquiring a reflection calibration fingerprint data light1 by the fingerprint recognition unit; and displaying the first image by the display panel and acquiring a black calibration fingerprint data light2 by the fingerprint recognition unit; during a fingerprint recognition, displaying the first image by the display panel and acquiring a bright screen fingerprint data raw by the fingerprint recognition unit; performing calibration by the fingerprint recognition unit according to a calibration formula (2) to obtain a calibrated fingerprint recognition data image, $$\text{image} = \frac{raw - light2}{light1 - light2}. \tag{2}$$

In a fifth aspect, embodiments of the present disclosure further provide an electronic device. The electronic device includes the above display device.

Embodiments of the disclosure provide the fingerprint recognition calibration method. During the initial calibration, the display panel displays the first image, the fingerprint recognition unit acquires the bright screen calibration fingerprint data light'; and the display panel does not display and the fingerprint recognition unit acquires the dark screen calibration fingerprint data dark'. Then, during the fingerprint recognition, the display panel displays the first image and the fingerprint recognition unit acquires the bright screen fingerprint data raw. Finally, the calibration is performed through the formula (1) so as to obtain the calibrated fingerprint recognition data image. In embodiments of the present disclosure, after the fingerprint recognition calibration, a fingerprint recognition module has a fixed background interference signal, so that the fingerprint recognition module can acquire any frame of fingerprint image under the fixed background interference signal, the problem of inaccurate fingerprint image caused by non-uniform background interference signals is eliminated, and the calibrated fingerprint recognition unit makes the fingerprint recognition module have a high fingerprint recognition accuracy.

BRIEF DESCRIPTION OF DRAWINGS

To describe technical solutions of embodiments of the present disclosure more clearly, accompanying drawings used for describing the embodiments are briefly presented below. Apparently, the presented accompanying drawings are merely accompanying drawings of a part of the embodiments to be described in the disclosure rather than all accompanying drawings. For those skilled in the art, other accompanying drawings may be obtained based on these accompanying drawings without creative work.

DETAILED DESCRIPTION

To make the objectives, technical solutions, and advantages of the present disclosure clearer, the technical solutions of the present disclosure will be fully and clearly described below through embodiments with reference to the accompanying drawings in the embodiments of the present disclosure. Apparently, the embodiments set forth below are a part of embodiments of the present disclosure rather than all embodiments. All other embodiments obtained by persons of ordinary skill in the art based on the embodiments of the present disclosure without creative efforts should fall within the protection scope of the present disclosure.

Figure 1:
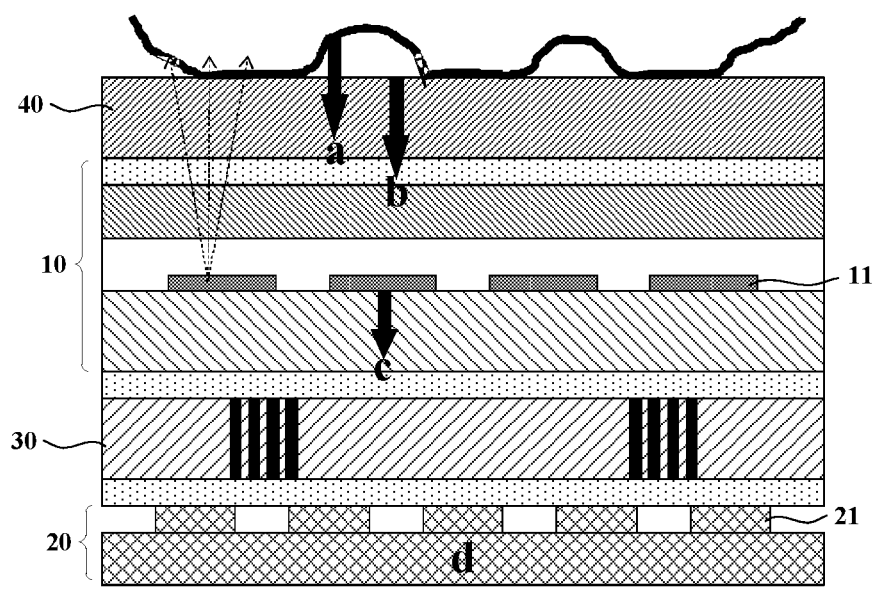
FIG. 1 is a schematic diagram showing a display device provided by an embodiment of the present disclosure.

FIG. 1 is a schematic diagram showing a display device provided by an embodiment of the present disclosure. As shown in FIG. 1, the display device includes a display panel 10 and a fingerprint recognition module 20. A light transmittable film 30 is provided between the display panel 10 and the fingerprint recognition module 20. The fingerprint recognition module 20 includes a plurality of fingerprint recognition units 21. The display panel 10 includes a plurality of pixel units 11. The pixel unit 11 is a sub pixel region defined by data lines and scanning lines. In one embodiment, the pixel unit 11 is a red sub pixel, a green sub pixel or a blue sub pixel. A surface of the display panel 10 away from the fingerprint recognition module 20 is provided with a glass cover plate 40. The light transmittable film 30 allows incident light with a relatively small angle to pass through the light transmittable film 30 and to be incident to the fingerprint recognition unit 21, thereby preventing the fingerprint recognition unit 21 from receiving crosstalk signals at other positions and improving the fingerprint recognition accuracy of the fingerprint recognition unit 21. In one embodiment, the light transmittable film 30 may be a small-angle light transmittable film such as an optical shutter, an optical panel, a light-collimating film or the like. In one embodiment, the display panel 10 is an organic light-emitting display panel. However, the type of the display panel 10 is not limited to the organic light-emitting display panel.

FIG. 1 merely illustrates the internal structure of the display device, but the specific structure of the display device is not illustrated, and display devices based on the above structure all fall within the scope of the present disclosure. It should be noted that, the display device in which the light transmittable film 30 is integrated in the display panel 10 shown in FIG. 2 also falls within the scope of the disclosure.

The fingerprint recognition principle of the above display device is described below. In a fingerprint recognition phase, a display surface of the display device is pressed by a finger of a user, a part of light emitted from a fingerprint recognition light source will irradiate the finger and will be reflected by a surface of the fingerprint to form a reflected light. The reflected light formed by reflection at the fingerprint is incident into the fingerprint recognition unit 21, received by the fingerprint recognition unit 21 and converted to a current signal. The fingerprint recognition module 20 generates a fingerprint recognition image according to the current signals of the plurality of fingerprint recognition units 21 so as to achieve fingerprint recognition. The ridges of the fingerprint of the finger pressing the display surface of the display device are in contact with the display surface of the display device, while the valleys are not in contact with the display surface of the display device, so that a reflectance of the light radiating on the valley of the fingerprint is different from a reflectance of the light radiating on the ridge of the fingerprint. Further, the intensity of the reflected light received by the fingerprint recognition unit 21 which is formed at the ridge is different from the intensity of the reflected light received by the fingerprint recognition unit 21 which formed at the valley, such that the magnitude of the current signal converted from the reflected light formed at the ridge is different from the magnitude of the current signal converted from the reflected light formed at the valley. The fingerprint recognition is performed according to the magnitudes of the current signals.

It should be noted that the reflected light received by the fingerprint recognition unit 21 is not only associated with the fingerprint but also associated with the pattern of the display surface of the display device. Specifically, when the user's finger presses the display surface of the display device, the display surface of the display device has a ridge-valley pattern identical to the fingerprint of the user's finger. After the fingerprint recognition light irradiates the display surface of the display device, the fingerprint recognition light is reflected by the ridge-valley pattern of the display surface of the display device. However, when the fingerprint of the finger presses the display surface of the display device, the valley is not in contact with the display surface of the display device, so that the fingerprint recognition light would be first refracted into the finger valley; then reflected to the display surface of the display device, and finally refracted into the interior of the display device and be incident to the fingerprint recognition unit 21, which causes a large error. In view of this, the detected fingerprint image to be recognized by the fingerprint recognition module 20 actually is based on the pattern of the display surface of the display device.

Therefore, the reflected light received by the fingerprint recognition unit 21 is associated with the fingerprint reflection light and also is associated with the reflected light of the display surface of the display device. Accordingly, the fingerprint recognition image recognized by the fingerprint recognition module 20 is associated with the touch body pattern a and the pattern b of the display surface of the display device.

In the case where the pixel unit 11 emits light, the reflected light received by the fingerprint recognition unit 21 is also associated with a light-leakage of the pixel unit. Specifically, the pixel units 11 are arranged in an array. When the pixel units 11 emit light, light-leakage occurs at backsides of the pixel units 11, and the leaked light will be incident to the fingerprint recognition unit 21. Accordingly, the fingerprint recognition image recognized by the fingerprint recognition module 20 is associated with the light-leakage c of the pixel unit array.

When the fingerprint recognition unit 21 converts the received fingerprint recognition light signal into the fingerprint data, it will be affected by an overall temperature fluctuation of the fingerprint recognition module 20, causing a signal drift. Accordingly, the fingerprint recognition image recognized by the fingerprint recognition module 20 is associated with the temperature fluctuation d of the fingerprint recognition module.

To sum up, affecting factors for affecting the fingerprint recognition image recognized by the fingerprint recognition module 20 mainly include: the touch body pattern a, the pattern b of the display surface of the display device, the light-leakage c of the pixel unit array and the temperature fluctuation d of the fingerprint recognition module. The reflected light intensity of touch body pattern a and the leaked light intensity of the light-leakage c of the pixel unit array are typically greater than the reflected light intensity of the pattern b of the display surface of the display device. Therefore, the pattern b of the display surface of the display device is mixed by a strong interference background and hence is hard to be recognized accurately.

In addition, the touch body pattern a is the same as the pattern b of the display surface of the display device, the pixel unit array is a periodic pattern; the fingerprint recognition unit array of the fingerprint recognition module is also a periodic pattern; and the periodicity of the pixel unit array is different from the periodicity of the fingerprint recognition unit array; thus the fingerprint recognition image recognized by the fingerprint recognition module 20 has obvious moire.

The following fingerprint recognition calibration method provided by embodiments of the present disclosure realizes the calibration of the fingerprint recognition image, thereby not only improving the fingerprint recognition accuracy but also weakening the moire.

Figure 3:
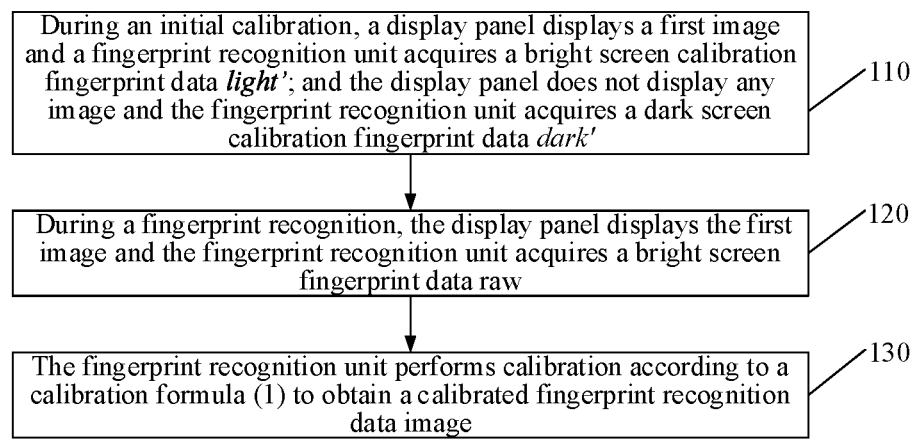
FIG. 3 is a flowchart of a fingerprint recognition calibration method for a display device provided by an embodiment of the present disclosure.

Based on the above technical solutions, with reference to FIG. 3 which is a flowchart of a fingerprint recognition calibration method for a display device provided by an embodiment of the present disclosure, the fingerprint recognition calibration method provided by this embodiment starts from preparing a fingerprint recognition module which has a plurality of fingerprint units.

At step 110, during an initial calibration, the display panel displays a first image and the fingerprint recognition unit acquires a bright screen calibration fingerprint data light; and the display panel does not display any image and the fingerprint recognition unit acquires a dark screen calibration fingerprint data dark'.

As described above, the first image is any bright image. In one embodiment, the first image is a red image or a green image. In other embodiments, the first image is a white image. The specific content of the first image is not specifically limited in embodiments of the present disclosure. After the first image is determined, the display panel displays the first image, the process of displaying the first image by the display panel is similar to that in the related art and is not repeated here.

When the display panel displays the first image, the fingerprint recognition unit acquires the bright screen calibration fingerprint data light'. At this time, the display device is lightened, a touch body having a smooth surface touches the touch display device, and then the fingerprint recognition unit in the display device acquires the fingerprint recognition light signal reflected by the touch body, the fingerprint recognition unit generates the fingerprint data based on the fingerprint recognition light signal, and the fingerprint data is just the bright screen calibration fingerprint data light'.

When the display panel does not display any image, the fingerprint recognition unit acquires the dark screen calibration fingerprint data dark'. At this time, the display device is not lightened, the light-shielding substrate shields the display surface of the display device to prevent the display surface from being irradiated by external light, the display device is not touched and the fingerprint recognition unit in the display device generates fingerprint data.

This step is a process of acquiring fingerprint recognition calibration data, that is, the initial calibration phase. It should be noted that, the bright screen calibration fingerprint data light' and the dark screen calibration fingerprint data dark' are calibration fingerprint data for calibration that is pre-acquired and stored prior to shipment.

At step 120, during fingerprint recognition, the display panel displays the first image and the fingerprint recognition unit acquires a bright screen fingerprint data raw.

As described above, the first image displayed by the display panel in the fingerprint recognition phase is the same as the first image displayed by the display panel in the initial calibration phase. When the display panel displays the first image, the fingerprint recognition unit acquires the bright screen fingerprint data raw. At this moment, the display device is lightened, the user's finger touches the display device; the fingerprint recognition unit in the display device acquires the fingerprint recognition light signal reflected by the touch body, the fingerprint recognition unit generates the fingerprint data based on the fingerprint recognition light signal, and the fingerprint data is the bright screen fingerprint data raw.

This step is a process of acquiring fingerprint recognition data, that is, the fingerprint recognition phase. It should be noted that, the bright screen fingerprint data raw is the user inputted fingerprint, the fingerprint data acquires and generates the fingerprint recognition unit, and the fingerprint data is the fingerprint data to be calibrated.

At step 130, the fingerprint recognition unit performs calibration according to a calibration formula (1) to obtain a calibrated fingerprint recognition data image.

$$\text{image} = \frac{raw - dark1}{light' - dark'}. \quad (1)$$

dark1 is the dark screen calibration fingerprint data dark' acquired by the fingerprint recognition unit when the display panel does display any image during the initial calibration; or dark1 is the dark screen fingerprint data dark acquired by the fingerprint recognition unit before the display panel displays the first image during the fingerprint recognition.

As mentioned above, when dark1 is the dark screen calibration fingerprint data dark', the formula (1) is changed to a formula (1A), specifically, $$\text{image} = \frac{raw - dark'}{light' - dark'}. \quad (1A)$$

As mentioned above, during the initial calibration phase, the fingerprint recognition unit acquires the bright screen calibration fingerprint data light' and the dark screen calibration fingerprint data dark' according to step 110; and during the fingerprint recognition phase, the fingerprint recognition unit acquires the bright screen fingerprint data raw according to step 120. The fingerprint recognition unit calibrates the bright screen fingerprint data raw according to the formula (1A), and obtains the calibrated fingerprint recognition data image. Likewise, each fingerprint recognition unit of the display device performs calibration according to the above step 110 to step 130.

It should be noted that, after the fingerprint recognition module acquires the fingerprint recognition data image of each fingerprint recognition unit, a calibrated fingerprint image Pimage is obtained. According to the fingerprint recognition data image of the fingerprint recognition unit and the formula (1A), $$Pimage = \frac{Praw - Pdark'}{Plight' - Pdark'} = \frac{a+b+c+d}{a+c} = 1 + \frac{b}{a+c} + \frac{d}{a+c}$$

The specific analysis process is as follow.

Praw is the bright screen fingerprint image acquired in the fingerprint recognition phase. When the fingerprint recognition module recognizes an image, a user's finger presses the display surface of the display device, and thus the affecting factors of the Praw include the touch body pattern a, the pattern b of the display surface of the display device and the temperature fluctuation d of the fingerprint recognition module. Besides, pixel unit light-leakage exists when the display panel displays the first image, so that the affecting factors of the Praw further include pixel unit array light-leakage c. Therefore, the affecting factors of Praw include the touch body pattern a, the pattern b of the display surface of the display device, the pixel unit array light-leakage c, and the temperature fluctuation d of the fingerprint recognition module.

Pdark' is the dark screen calibration fingerprint image acquired in the initial calibration phase. When the fingerprint recognition module acquires this calibration image, no user's finger touches the display panel and the display panel does not display any image, so that the affecting factor of Pdark' only includes the temperature fluctuation d of the fingerprint recognition module.

Plight' is the bright screen calibration fingerprint image acquired in the initial calibration phase. When the fingerprint recognition module acquires this calibration image, the touch body having a smooth surface touches the display device, and at this time, the touch body pattern a is the same as the pattern b of the display surface of the display device. Further, the display panel displays the first image, that is, there exists pixel unit light-leakage. Therefore, the affecting factors of the Plight' includes the touch body pattern a, the pixel unit array light-leakage c, and the temperature fluctuation d of the fingerprint recognition module.

The time of acquiring the bright screen fingerprint image Praw is the time when the user uses the display device, and the dark screen calibration fingerprint image Pdark' is acquired before the shipment of the display device. The temperature fluctuation d of the fingerprint recognition module affecting Praw is quite different from the temperature fluctuation d of the fingerprint recognition module affecting the Pdark', so that Praw-Pdark' cannot eliminate the impact caused by the temperature fluctuation d of the fingerprint recognition module. The affecting factors of Praw-Pdark' includes: the touch body pattern a, the pattern b of the display surface of the display device, the pixel unit array light-leakage c, and the temperature fluctuation d of the fingerprint recognition module.

Before the shipment, the bright screen calibration fingerprint image Plight' and the dark screen calibration fingerprint image Pdark' of the display device are acquired in a short time. Hence, the temperature fluctuation d of the fingerprint recognition module affecting Plight' is almost the same as the temperature fluctuation d of the fingerprint recognition module affecting Pdark'. Therefore, Plight'-Pdark' can eliminate the impact caused by the temperature fluctuation d of the fingerprint recognition module. The affecting factor of Plight'-Pdark' includes the touch body pattern a and the pixel unit array light-leakage c.

Therefore, $$Pimage = \frac{b}{a+c} + \frac{d}{a+c} + 1$$

applies, wherein 1+d/(a+c) is a background interference signal. In a case where the temperature influence of the fingerprint recognition module is small, 1+d/(a+c) may be regarded as a uniform data, thereby weakening the moire. Therefore, after the calibration, during each fingerprint recognition process, each frame of fingerprint image acquired by the fingerprint recognition module has the almost the same background interference signal 1+d/(a+c). The influence on the fingerprint image caused by non-uniform background interference signals is avoided by the calibration of the fingerprint recognition unit, and the calibrated fingerprint recognition module has a high fingerprint recognition accuracy.

It should be noted that, although background parts of the pattern b of the display surface of the display device, the touch body pattern a and the pixel unit array light-leakage c are differently distributed, the somewhat non-uniform within the fingerprint image does not affect the overall recognition accuracy. On the other hand, when taking dark' as dark1, the fingerprint recognition phase is the time when the user uses the display device, the calibration can be performed by just acquiring one frame of bright screen fingerprint data raw, thereby reducing an acquisition time.

When dark1 is the dark screen fingerprint data dark acquired by the fingerprint recognition unit before the display panel displays the first image during the fingerprint recognition, the formula (1) becomes a formula (1B):

$$image = \frac{raw - dark}{light' - dark'}. \quad (1B)$$

For the operation in step 120, in the fingerprint recognition phase, the fingerprint recognition unit further needs to acquire the dark screen fingerprint data dark before displaying the first image. The process of the acquiring the dark screen fingerprint data dark by the fingerprint recognition unit is as follows. In the fingerprint recognition phase, before the display panel displays the first image, the fingerprint recognition unit acquires the dark screen fingerprint data dark. At this moment, the display device is not lightened; the display surface of the display device is shielded by the light-shielding substrate to prevent the external light from irradiating the display surface and the display device is not touched by the user's finger, and the fingerprint recognition unit of the display device generates the fingerprint data.

In step 130, after the fingerprint recognition unit calibrates the bright screen fingerprint data raw according to the formula (1B), the calibrated fingerprint recognition data image is obtained. Likewise, each fingerprint recognition unit of the display device is calibrated according to the above step 110 to step 130.

It should be noted that, after the fingerprint recognition module acquires the fingerprint recognition data image of each fingerprint recognition unit, the calibrated fingerprint image Pimage is obtained. According to the formula (1B) of the fingerprint recognition data image of the fingerprint recognition unit:

$$Pimage = \frac{Praw - Pdark}{Plight' - Pdark'} = \frac{a+b+c}{a+c} = 1 + \frac{b}{a+c}.$$

A specific analysis process is as follows.

Similar to formula (1A), affecting factors of Praw include the touch body pattern a, the pattern b of the display surface of the display device, the pixel unit array light-leakage c and the temperature fluctuation d of the fingerprint recognition module. The affecting factor of Pdark' only includes the temperature fluctuation d of the fingerprint recognition module; affecting factors of Plight' include the touch body pattern a, the pixel unit array light-leakage c and the temperature fluctuation d of the fingerprint recognition module; and affecting factors of Plight'-Pdark' include the touch body pattern a and the pixel unit array light-leakage c.

Pdark is the dark screen fingerprint image acquired in the fingerprint recognition phase. When the fingerprint recognition module acquires the dark screen fingerprint image, no user's finger touches the display panel and the display panel does not display any image, so that the affecting factor of Pdark only includes the temperature fluctuation d of the fingerprint recognition module.

In the fingerprint recognition phase, a time interval between acquiring the bright screen fingerprint image Praw and acquiring the dark screen fingerprint image Pdark is typically very short, so that the temperature fluctuation d of the fingerprint recognition module affecting Praw is almost the same as the temperature fluctuation d of the fingerprint recognition module affecting Pdark. Therefore, Praw-Pdark can eliminate the influence caused by the temperature fluctuation d of the fingerprint recognition module, and the affecting factor of Praw-Pdark includes the touch body pattern a, the pattern b of the display surface of the display device, and the pixel unit array light-leakage c.

Thus, $$Pimage = \frac{b}{a+c} + 1.$$

The background interference signal is 1, the influence of temperature fluctuation d of the fingerprint recognition module is eliminated and the moire is reduced. Therefore, after calibration, each frame of fingerprint image acquired by the fingerprint recognition module has the identical background interference signal 1 during each fingerprint recognition process. Through the calibration of the fingerprint recognition unit, the influence on the fingerprint image caused by non-uniform background interference signals is eliminated and the calibrated fingerprint recognition module has a high fingerprint recognition accuracy. It should be noted that, 1 denotes the completely uniform background interference signal rather than the value of the background interference signal.

Embodiments of the disclosure provide the fingerprint recognition calibration method. During the initial calibration, the display panel displays the first image; the fingerprint recognition unit acquires the bright screen calibration fingerprint data light'; and the display panel does not display any image and the fingerprint recognition unit acquires the dark screen calibration fingerprint data dark'. Then, during the fingerprint recognition, the display panel displays the first image and the fingerprint recognition unit acquires the bright screen fingerprint data raw. Finally, the calibration is performed through the formula (1) so as to obtain the calibrated fingerprint recognition data image. In embodiments of the present disclosure, after the fingerprint recognition calibration, a fingerprint recognition module has a fixed background interference signal. Hence the fingerprint recognition module acquires any frame of fingerprint image under the fixed background interference signal, so that a problem of inaccurate fingerprint image caused by non-uniform background interference signals is eliminated; and the calibrated fingerprint recognition unit makes the fingerprint recognition module have a high fingerprint recognition accuracy.

In one embodiment, the specific process of acquiring the bright screen calibration fingerprint data light' and the dark screen calibration fingerprint data dark' by the fingerprint recognition unit is as follows. The display panel displays the first image, the fingerprint recognition unit acquires the fingerprint data reflected by the touch body and takes the fingerprint data as the bright screen calibration fingerprint data light'; the display panel does not display any image, the fingerprint recognition unit acquires the fingerprint data when the display surface of the display panel is provided with a light-shielding substrate, and the fingerprint data is taken as the dark screen calibration fingerprint data dark'. The light-shielding substrate is in direct contact with the display surface of the display device. Alternatively, the light-shielding substrate and the display surface of the display device are spaced apart from each other by a first distance, and the first distance is greater than or equal to 10 micrometers and less than or equal to 10 centimeters.

In one embodiment, the specific process of acquiring the bright screen calibration fingerprint data light' by the fingerprint recognition unit is as follows. The fingerprint recognition unit acquires the fingerprint data reflected by the finger that is not in direct contact with the display surface of the display device and takes the fingerprint data as the bright screen calibration fingerprint data light'. Alternatively, each fingerprint recognition unit acquires the fingerprint data reflected by the finger that is in direct contact with the display surface of the display device and takes an average value of the fingerprint data of the fingerprint recognition units as the bright screen calibration fingerprint data light'. Alternatively, the fingerprint recognition unit acquires the fingerprint data reflected by a first touch body that is in direct contact with the display surface of the display device and takes the fingerprint data as the bright screen calibration fingerprint data light'. A standard reflectance of the first touch body is equal to a standard reflectance of the finger.

In one mode, the fingerprint recognition unit acquires the fingerprint data reflected by the finger that is not in direct contact with the display surface of the display device and takes the fingerprint data as the bright screen calibration fingerprint data light'. Since the finger of the testing user is not in direct contact with the display surface of the display panel, most of lights emitted from the fingerprint recognition light source are reflected through the display surface of the display device. The display surface of the display device is smooth, so that the bright screen calibration fingerprint data light' can be regarded as being reflected by the touch body having a smooth surface. In this case, the bright screen calibration fingerprint data light' acquired by the fingerprint recognition unit is most accurate when it is used as the calibration fingerprint data, and thus the influence caused by the difference of finger reflection characteristics of different users can also be avoided.

In another mode, each fingerprint recognition unit acquires the fingerprint data reflected by the finger that is in direct contact with the display surface of the display device and takes an average value of the fingerprint data of the fingerprint recognition units as the bright screen calibration fingerprint data light'. The finger of the testing user is in direct contact with the display surface of the display device, so that the light emitted from the fingerprint recognition light source is reflected by the finger of the testing user and then transmitted to the fingerprint recognition unit to generate the fingerprint data. The fingerprint data of the fingerprint recognition units are summed and then averaged, so each fingerprint recognition unit has a same bright screen calibration fingerprint data light'. Accordingly, the fingerprint recognition unit acquires the fingerprint data according to the touch body having the smooth surface. Compared to the first mode, the data acquisition process of the second mode is simpler and further can reduce the influence of the finger reflection signal on the calibrated fingerprint data.

In further another mode, the fingerprint recognition unit acquires the fingerprint data reflected by a first touch body that is in direct contact with the display surface of the display device and takes the fingerprint data as the bright screen calibration fingerprint data light'. The standard reflectance of the first touch body is equal to the standard reflectance of the finger. The reflectance of the first touch body is similar to the reflectance of the finger. However, the first touch body has no fingerprint valley-ridge pattern of the finger. That is, the first touch body has the smooth surface. Therefore, the bright screen calibration fingerprint recognition data light' reflected by the uniform touch body may be acquired. This bright screen calibration fingerprint recognition data light' only can be used for predicting the general characteristics of the reflection of the user's finger, and its advantage lies in that this calibration fingerprint data can be unified before the shipment.

In one embodiment, when dark1 is the dark screen calibration fingerprint data dark', a specific process of performing the calibration to obtain the calibrated fingerprint recognition data image by the fingerprint recognition unit according to the calibration formula (1) is as follows. The fingerprint recognition unit acquires the difference value of the ridge signal and the valley signal of the finger according to the bright screen fingerprint data raw, and performs calibration to obtain the calibrated fingerprint recognition data image according to the calibration formula (1) when it is detected that the difference value of the ridge signal and the valley signal of the finger is greater than or equal to a reference signal threshold.

In this case, the fingerprint recognition unit acquires the difference value of the ridge signal and the valley signal of the finger according to the bright screen fingerprint data raw. If it is detected that the difference value of the ridge signal and the valley signal of the finger is greater than or equal to a reference signal threshold, it means that the temperature fluctuation of the fingerprint recognition module is small. In this case, the dark screen calibration fingerprint data dark' can be directly used as dark1, that is, the calibration is performed according to the formula (1A). The fingerprint recognition unit acquires the difference value of the ridge signal and the valley signal of the finger according to the bright screen fingerprint data raw. If it is detected that the difference value of the ridge signal and the valley signal of the finger is less than the reference signal threshold, it means that the temperature fluctuation of the fingerprint recognition module is large. In this case, the dark screen fingerprint data dark can be used as dark1, that is, the calibration is performed according to the formula (1B).

In one embodiment, a specific process of determining the reference signal threshold by the fingerprint recognition unit is as follows. The display panel does not display any image and the display surface of the display device is provided with a light-shielding substrate, the fingerprint recognition unit acquires a first reference fingerprint data when the display device is at the lowest application temperature T1; and acquires a second reference fingerprint data when the display device is at the highest application temperature T2, where $-40°$ C.$\leq$T1$\leq$0° C. and 20° C.$\leq$T2$\leq$80° C. An absolute value of the difference between the first reference fingerprint data and the second reference fingerprint data is determined as the reference signal threshold.

The display panel does not display any image, the display surface of the display device is provided with the light-shielding substrate, and the display device is at the lowest application temperature T1, where $-40°$ C.$\leq$T1$\leq$0° C. In the present embodiment, T1 is $-40°$ C. Then, the fingerprint recognition unit acquires the first reference fingerprint data without touching the display device by the touch body, so that the first reference fingerprint data is only associated with the temperature fluctuation d of the fingerprint recognition module. Those skilled in the art may understand that, the associated practitioner may design the temperature value of T1 reasonably according to the application requirement of the product. For example, in one embodiment, T1 is below $-40°$ C., the temperature value of T1 is not specifically limited in this disclosure.

The display panel does not display any image; the display surface of the display device is provided with the light-shielding substrate; and the display device is at the highest application temperature T2, where 20° C.$\leq$T2$\leq$80° C. In this embodiment, T2 is equal to 80° C. Then, the fingerprint recognition unit acquires the second reference fingerprint data without touching the display device by the touch body, so the second reference fingerprint data is only associated with the temperature fluctuation d of the fingerprint recognition module. Those skilled in the art may understand that, the associated practitioner may design the temperature value of T2 reasonably according to the application requirement of the product. For example, in one embodiment, T2 is above 80° C., the temperature value of T2 is not specifically limited in this disclosure.

Finally, the fingerprint recognition unit determines the absolute value of the difference between the first reference fingerprint data and the second reference fingerprint data as the reference signal threshold, which characterizes the temperature fluctuation of the fingerprint recognition module of the display device between the lowest application temperature and the highest application temperature. Based on this, the magnitude of the temperature fluctuation of the fingerprint recognition module is determined. It should be noted that any substrate (such as the light-shielding substrate, the reflection substrate and the like) provided on the display surface of the display device in this disclosure is an uniform substrate.

In one embodiment, when dark1 is the dark screen fingerprint data dark, during the fingerprint recognition, before the display panel displays the first image, the fingerprint recognition unit acquires the dark screen fingerprint data dark. A specific process of acquiring the dark screen fingerprint data dark and the bright screen fingerprint data raw by the fingerprint recognition unit includes: in a first time length, the fingerprint recognition unit sequentially acquires the dark screen fingerprint data dark and the bright screen fingerprint data raw, where the first time length is less than or equal to 5 seconds.

In the fingerprint recognition phase, before the display panel displays the first image, the display panel does not display any image and the fingerprint recognition unit acquires the dark screen fingerprint data dark. At this moment, the display device is not lightened, the display surface of the display device is shielded by the light-shielding substrate and the display device is not touched, and then the fingerprint recognition unit in the display device generates the fingerprint data and this fingerprint data is the dark screen fingerprint data dark. Apparently, the dark screen fingerprint data dark is only associated with the temperature fluctuation d of the fingerprint recognition module. In the fingerprint recognition phase, if the interval between the time of acquiring dark and the time of acquiring raw by the fingerprint recognition unit is relatively long, the difference between the temperature fluctuation d of the fingerprint recognition module affecting dark and the temperature fluctuation d of the fingerprint recognition module affecting raw is relatively large, causing the inability to eliminate the influence of the temperature fluctuation d of the fingerprint recognition module. Based on this, in one embodiment, the interval between the time of acquiring dark and the time of acquiring raw by the fingerprint recognition unit is relatively short, the specific time interval (namely, the first time length) is less than or equal to 5 seconds, so that the difference between the temperature fluctuation d of the fingerprint recognition module affecting dark and the temperature fluctuation d of the fingerprint recognition module affecting raw is small, thereby eliminating the influence of the temperature fluctuation d of the fingerprint recognition module by means of Praw-Pdark.

Figure 2:
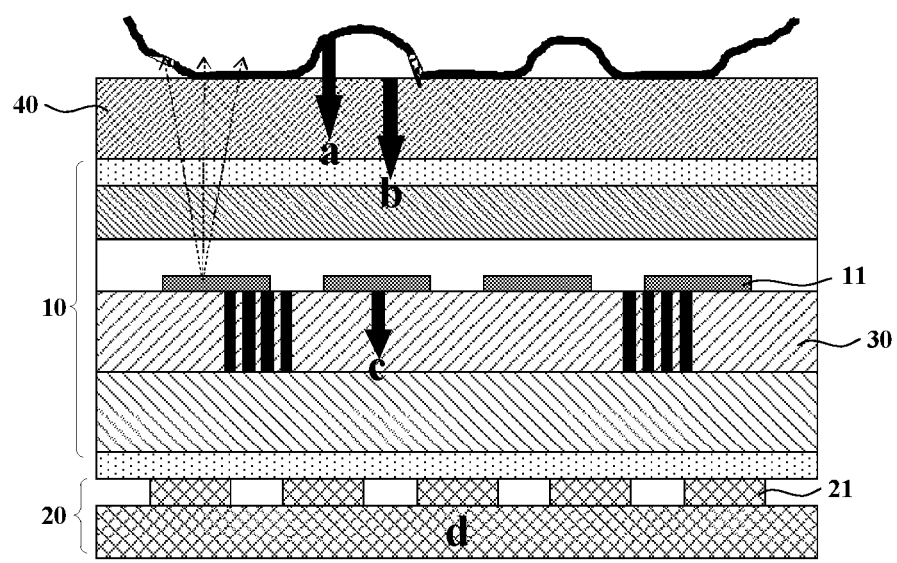
FIG. 2 is a schematic diagram showing a display device provided by an embodiment of the present disclosure.
Figure 4:
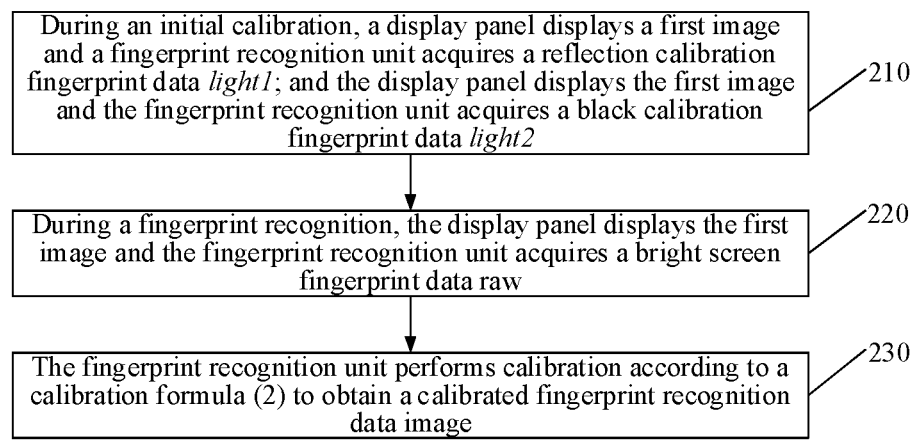
FIG. 4 is a flowchart of a fingerprint recognition calibration method for a display device provided by an embodiment of the present disclosure.

In one embodiment, on the basis of the display device shown in FIGS. 1 and 2, FIG. 4 is a flowchart of a fingerprint recognition calibration method for a display device provided by an embodiment of the present invention. With reference to FIG. 4, the fingerprint recognition calibration method provided by this embodiment includes the following steps for any fingerprint recognition unit.

In step 210, during an initial calibration, the display panel displays the first image, the fingerprint recognition unit acquires a reflection calibration fingerprint data light1; and the display panel displays the first image and the fingerprint recognition unit acquires a black calibration fingerprint data light2.

As mentioned above, the first image is any bright image. In one embodiment, the first image is a red image or a green image. In other embodiments, the first image is a white image. The specific content of the first image is not specifically limited in embodiments of the present disclosure.

When the display panel displays the first image, the fingerprint recognition unit acquires the reflection calibration fingerprint data light1. In one embodiment, the display panel displays the first image; the fingerprint recognition unit acquires the fingerprint data when the display surface of the display device is provided with a reflection substrate, and the fingerprint data is taken as the reflection calibration fingerprint data light1. In one embodiment, the reflection substrate is, for example, a mirror and the like. At this moment, the display device is lightened and does not require to be touched. Apparently, the light emitted from the fingerprint recognition light source is reflected by the reflection substrate that serves as the touch body, and then the fingerprint recognition unit in the display device acquires the fingerprint recognition light signal reflected by the reflection substrate, the fingerprint recognition unit generates the fingerprint data according to the fingerprint recognition light signal, and the fingerprint data is the reflection calibration fingerprint data light1.

When the display panel displays the first image, the fingerprint recognition unit acquires the black calibration fingerprint data light2. In one embodiment, the display panel displays the first image, the fingerprint recognition unit acquires the fingerprint data when the display surface of the display device is provided with a black substrate, and the fingerprint data is taken as the black calibration fingerprint data light2. The black substrate is disposed on the display surface of the display device. At this moment, the display device is lightened and does not require to be touched. Apparently, the light emitted from the fingerprint recognition light source is reflected by the black substrate that serves as the touch body, and then the fingerprint recognition unit in the display device acquires the fingerprint recognition light signal reflected by the black substrate, the fingerprint recognition unit generates the fingerprint data according to the fingerprint recognition light signal, and the fingerprint data is the black calibration fingerprint data light2.

In one embodiment, the reflection substrate is in direct contact with the display surface of the display device when the fingerprint recognition unit acquires the reflection calibration fingerprint data light1, and the black substrate is in direct contact with the display surface of the display device when the fingerprint recognition unit acquires the black calibration fingerprint data light2. Alternatively, in one embodiment, the reflection substrate and the display surface of the display device are spaced apart by a first distance when the fingerprint recognition unit acquires the reflection calibration fingerprint data light1; and the black substrate and the display surface of the display device are spaced apart by the first distance when the fingerprint recognition unit acquires the black calibration fingerprint data light2, and the first distance is greater than or equal to 10 micrometers or less than or equal to 10 centimeters.

This step is a process of acquiring fingerprint recognition calibration data and is referred to as an initial recognition phase. It should be noted that the reflection calibration fingerprint data light1 and the black calibration fingerprint data light2 are calibration fingerprint data for calibration which are acquired and stored in advance before the shipment.

In step 220, during a fingerprint recognition, the display panel displays the first image and the fingerprint recognition unit acquires the bright screen fingerprint data raw. The process of acquiring the bright screen fingerprint data raw by the fingerprint recognition unit in this step is similar to that in step 120 in above embodiments, and is not repeated and set forth here.

In step 230, the fingerprint recognition unit performs calibration according to a calibration formula (2) to obtain a calibrated fingerprint recognition data image, $$\text{image} = \frac{\text{raw} - \text{light2}}{\text{light1} - \text{light2}}. \quad (2)$$

As mentioned above, the fingerprint recognition unit acquires the reflection calibration fingerprint data light1 and the black calibration fingerprint data light2 according to the step 210 in the initial calibration phase; the fingerprint recognition unit acquires the bright screen fingerprint data raw according to the step 220. Then, the fingerprint recognition unit calibrates the bright screen fingerprint data raw according to the formula (2), and then obtains the calibrated fingerprint recognition data image. Likewise, each fingerprint recognition unit of the display device is calibrated according to the above step 210 to step 230.

It should be noted that, after the fingerprint recognition module acquires the fingerprint recognition data image of each fingerprint recognition unit, a calibrated fingerprint image Pimage is obtained. According to the formula (2) of the fingerprint recognition data image of the fingerprint recognition unit, $$\text{Pimage} = \frac{\text{Praw} - \text{Plight2}}{\text{Plight1} - \text{Plight2}} = \frac{a+b+d}{a}.$$

The specific analysis process is as follow.

Praw is the bright screen fingerprint image acquired in the fingerprint recognition phase. When the fingerprint recognition module recognizes an image, a user's finger presses the display surface of the display device, and thus the affecting factor of the Praw includes the touch body pattern a, the pattern b of the display surface of the display device and the temperature fluctuation d of the fingerprint recognition module. Pixel unit light-leakage exists when the display panel displays the first image, so that the affecting factor of the Praw would further include the pixel unit array light-leakage c. Therefore, the affecting factor of Praw includes the touch body pattern a, the pattern b of the display surface of the display device, the pixel unit array light-leakage c, and the temperature fluctuation d of the fingerprint recognition module.

Plight1 is the reflection calibration fingerprint image acquired in the initial calibration phase. When the fingerprint recognition module acquires this calibration image, a reflection substrate shields the display surface of the display device. At this moment, the touch body pattern a is identical to the pattern b of the display surface of the display device. Meanwhile, the display panel also displays the first image, that is, there exists the pixel unit light leakage. Therefore, the affecting factor of Plight1 includes the touch body pattern a, the pixel unit array light-leakage c, and the temperature fluctuation d of the fingerprint recognition module.

Plight2 is the black calibration fingerprint image acquired in the initial calibration phase. When the fingerprint recognition module acquires this calibration image, a black substrate shields the display surface of the display device. At this moment, the touch body pattern a is identical to the pattern b of the display surface of the display device. Meanwhile, the display panel also displays the first image, that is, there exists the pixel unit light leakage. Therefore, the affecting factor of Plight2 includes the touch body pattern a, the pixel unit array light-leakage c, and the temperature fluctuation d of the fingerprint recognition module.

Plight1 and Plight2 are acquired in a relatively short time before the shipment of the display device, so that the temperature fluctuation d of the fingerprint recognition module affecting Plight1 is almost the same as the temperature fluctuation d of the fingerprint recognition module affecting Plight2, and the influence caused by the temperature fluctuation d of the fingerprint recognition module can be eliminated by Plight1-Plight2. The display panel displays the first image when Plight1 is acquired and when Plight2 is acquired, and thus the pixel unit array light-leakage c affecting Plight1 is completely consistent with the pixel unit array light-leakage c affecting Plight2; and the influence of the pixel unit array light-leakage c can be eliminated by Plight1-Plight2. The reflectance of the reflection substrate and the reflectance of the black substrate are totally different, so that the touch body pattern a affecting Plight1 is different from the touch body pattern a affecting Plight2. From above, the affecting factor of Plight1-Plight2 only includes the touch body pattern a.

The bright screen fingerprint image Praw is acquired when the user uses the display device, while the black calibration fingerprint image Plight2 is acquired before the shipment of the display device. The temperature fluctuation d of the fingerprint recognition module affecting Praw is quite different from the temperature fluctuation d of the fingerprint recognition module affecting the Plight2, so that Praw-Plight2 cannot eliminate the impact caused by the temperature fluctuation d of the fingerprint recognition module. The display panel displays the first image when Praw is acquired and when Plight2 is acquired, so that the pixel unit array light-leakage c affecting Praw is completely consistent with the pixel unit array light-leakage c affecting Plight2, and the influence of the pixel unit array light-leakage c can be eliminated by Praw-Plight2. Therefore, the affecting factor of Praw-Plight2 includes the touch body pattern a, the pattern b of the display surface of the display device and the temperature fluctuation d of the fingerprint recognition module.

Therefore, $$Pimage = \frac{b}{a} + \frac{d}{a} + 1 \cdot 1 + d/a$$

is a background interference signal. In a case where the temperature influence of the fingerprint recognition module is small, 1+d/a may be regarded as a uniform data, thereby weakening the moire. Therefore, after calibration, during each fingerprint recognition process, each frame of fingerprint image acquired by the fingerprint recognition module has the almost the same background interference signal 1+d/a. The influence on the fingerprint image caused by non-uniform background interference signals is eliminated by the calibration of the fingerprint recognition unit, and the calibrated fingerprint recognition module has a high fingerprint recognition accuracy.

It should be noted that, although background parts of the pattern b of the display surface of the display device, the touch body pattern a, and the pixel unit array light-leakage c are differently distributed from each other; somewhat non-uniform within the fingerprint image does not affect the overall recognition accuracy. On the other hand, in the fingerprint recognition phase, i.e., the time when the user uses the display device, the calibration can be performed by just acquiring one frame of bright screen fingerprint data raw, thereby reducing an acquisition time.

In this embodiment, after the fingerprint recognition calibration, the fingerprint recognition module has a fixed background interference signal, so any frame of fingerprint image is acquired by the fingerprint recognition module under the fixed background interference signal, a problem of inaccurate fingerprint image caused by non-uniform background interference signals is eliminated, and the calibrated fingerprint recognition unit eanbles the fingerprint recognition module to have a high fingerprint recognition accuracy.

In one embodiment, a specific process of performing calibration by the fingerprint recognition unit according to the calibration formula (2) to obtain the calibrated fingerprint recognition data image is as follows. The fingerprint recognition unit acquires the difference value of the ridge signal and the valley signal of the finger according to the bright screen fingerprint data raw. When it is detected that the difference value of the ridge signal and the valley signal of the finger is greater than or equal to a reference signal threshold, the fingerprint recognition unit performs a calibration to obtain the calibrated fingerprint recognition data image according to the calibration formula (2). Here, the fingerprint recognition unit acquires the difference value of the ridge signal and the valley signal of the finger according to the bright screen fingerprint data raw. If it is detected that the difference value of the ridge signal and the valley signal of the finger is greater than or equal to the reference signal threshold, it means that the temperature fluctuation of the fingerprint recognition module is small, so that the calibration may be performed according to the formula (2).

In one embodiment, a specific process of determining the reference signal threshold by the fingerprint recognition unit is as follows. The display panel does not display any image and the display surface of the display device is provided with a light-shielding substrate, the fingerprint recognition unit acquires a first reference fingerprint data when the display device is at the lowest application temperature T1, and acquires a second reference fingerprint data when the display device is at the highest application temperature T2, where $-40° C. \leq T1 \leq 0° C.$ and $20° C. \leq T2 \leq 80° C.$ An absolute value of the difference between the first reference fingerprint data and the second reference fingerprint data is determined as the reference signal threshold.

The display panel does not display any image, the display surface of the display device is provided with the light-shielding substrate, and the display device is at the lowest application temperature T1, where $-40° C. \leq T1 \leq 0° C.$ In the present embodiment, T1 is $-40° C.$, the fingerprint recognition unit acquires the first reference fingerprint data without touching the display device by the touch body, so that the first reference fingerprint data is only associated with the temperature fluctuation d of the fingerprint recognition module. Those skilled in the art may understand that, the associated practitioner may design the temperature value of T1 by reasonably according to the application requirement of the product. For example, in one embodiment, T1 is below $-40° C.$, the temperature value of T1 is not specifically limited in this disclosure.

The display panel does not display any image, the display surface of the display device is provided with the light-shielding substrate, and the display device is at the highest application temperature T2, where $20° C. \leq T2 \leq 80° C.$ In this embodiment, T2 is equal to $80° C.$ At this moment, the fingerprint recognition unit acquires the second reference fingerprint data without touching the display device by the touch body, so that the second reference fingerprint data is only associated with the temperature fluctuation d of the fingerprint recognition module. Those skilled in the art may understand that, the associated practitioner may design the temperature value of T2 reasonably according to the application requirement of the product. For example, in one embodiment, T2 is above $80° C.$, the temperature value of T2 is not specifically limited in this disclosure.

Finally, the fingerprint recognition unit determines the absolute value of the difference between the first reference fingerprint data and the second reference fingerprint data as the reference signal threshold, that is, the reference signal threshold characterizes the temperature fluctuation of the fingerprint recognition module when the display device is between the lowest application temperature and the highest application temperature. The magnitude of the temperature fluctuation of the fingerprint recognition module is determined by taking the reference signal threshold as a standard. It should be noted that any substrate (such as the light-shielding substrate, the reflection substrate and the like) provided on the display surface of the display device in this disclosure is a uniform substrate.

Figure 5:
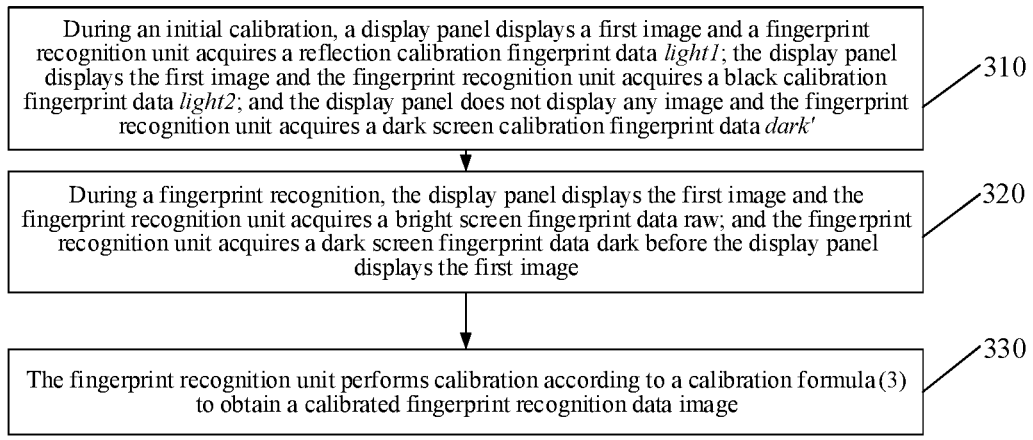
FIG. 5 is a flowchart of a fingerprint recognition calibration method for a display device provided by an embodiment of the present disclosure.

In one embodiment, embodiments of the present disclosure further provide another fingerprint recognition calibration method. The procedures of this fingerprint recognition calibration method are similar to that in FIG. 5. As shown in FIG. 5, the difference lies in that this fingerprint recognition calibration method includes the following steps.

At step 310, during an initial calibration, the display panel displays the first image, the fingerprint recognition unit acquires a reflection calibration fingerprint data light1; and the display panel displays the first image and the fingerprint recognition unit acquires a black calibration fingerprint data light2. It further includes, during the initial calibration, not displaying any image by the display panel and acquiring a dark screen calibration fingerprint data dark' by the fingerprint recognition unit. A process of acquiring the dark screen calibration fingerprint data dark' by the fingerprint recognition unit is as follows. When the display panel does not display any image, the fingerprint recognition unit acquires the dark screen calibration fingerprint data dark'. At this moment, the display device is not lightened, the display surface of the display device is shielded by the light-shielding substrate to prevent the external light from irradiating on the display surface and the display device is not touched, and then the fingerprint recognition unit in the display device generates the fingerprint data.

At step 320, during the fingerprint recognition, the display panel displays the first image, and the fingerprint recognition unit acquires the bright screen fingerprint data raw. It further includes, during the fingerprint recognition, acquiring the dark screen fingerprint data dark by the fingerprint recognition unit before the display panel displays the first image. The process of acquiring the dark screen fingerprint data dark by the fingerprint recognition unit is as follows. In the fingerprint recognition phase, the fingerprint recognition unit acquires the dark screen fingerprint data dark. At this moment, the display device is not lightened, the display surface of the display device is shielded by the light-shielding substrate to prevent the external light from irradiating on the display surface and the display device is not touched, and then the fingerprint recognition unit in the display device generates the fingerprint data.

At step 330, the fingerprint recognition unit performs calibration to obtain the calibrated fingerprint recognition data image according to a calibration formula (3), $$image = \frac{raw - dark - (light2 - dark')}{light1 - light2}. \quad (3)$$

As mentioned above, after the fingerprint recognition unit calibrates the bright screen fingerprint data raw according to the formula (3), the calibrated fingerprint recognition data image is obtained. Likewise, each fingerprint recognition unit of the display device is calibrated according to the above steps 310 to 330.

It should be noted that, after the fingerprint recognition module acquires the calibrated fingerprint recognition data image of each fingerprint recognition unit. According to the formula (3) of the fingerprint recognition data image of the fingerprint recognition unit, $$Pimage = \frac{Praw - Pdark - (Plight2 - Pdark')}{Plight1 - Plight2}.$$

A specific analysis process is as follows.

Similar to formula (2), the affecting factor of Praw includes the touch body pattern a, the pattern b of the display surface of the display device, the pixel unit array light-leakage c and the temperature fluctuation d of the fingerprint recognition module; the affecting factor of Plight1 includes the touch body pattern a, the pixel unit array light-leakage c and the temperature fluctuation d of the fingerprint recognition module; the affecting factor of Plight2 includes the touch body pattern a, the pixel unit array light-leakage c and the temperature fluctuation d of the fingerprint recognition module; and the affecting factor of Plight1-Plight2 includes the touch body pattern a.

Pdark is the dark screen fingerprint image acquired in the fingerprint recognition phase. When the fingerprint recognition module acquires the dark screen fingerprint image, no user's finger touches the display panel and the display panel does not display any image, so that the affecting factor of Pdark only includes the temperature fluctuation d of the fingerprint recognition module.

Pdark' is the dark screen calibration fingerprint image acquired in the initial calibration phase. When the fingerprint recognition module acquires this calibration image, no user's finger touches the display panel and the display panel does not display any image, so that the affecting factor of Pdark' only includes the temperature fluctuation d of the fingerprint recognition module.

In the fingerprint recognition phase, a time interval between acquiring the bright screen fingerprint image Praw and acquiring the dark screen fingerprint image Pdark is typically very short, so that the temperature fluctuation d of the fingerprint recognition module affecting Praw is almost the same as the temperature fluctuation d of the fingerprint recognition module affecting Pdark. Therefore, Praw-Pdark can eliminate the influence caused by the temperature fluctuation d of the fingerprint recognition module, and the affecting factor of Praw-Pdark includes the touch body pattern a, the pattern b of the display surface of the display device, and the pixel unit array light-leakage c.

The black screen calibration fingerprint image Plight2 and the dark screen calibration fingerprint image Pdark' are acquired in a short time before the shipment of the display device, so that the temperature fluctuation d of the fingerprint recognition module affecting Plight2 is almost the same as the temperature fluctuation d of the fingerprint recognition module affecting Pdark', and Plight2-Pdark' can eliminate the influence caused by the temperature fluctuation d of the fingerprint recognition module. Therefore, the affecting factor of Plight2-Pdark' includes the touch body pattern a and the pixel unit array light-leakage c.

When Plight2 is acquired and when Praw is acquired, the display panel displays the first image, so the pixel unit array light-leakage c affecting Plight2 is identical to the pixel unit array light-leakage c affecting Praw, and Praw-Pdark-(Plight2-Pdark') can eliminate the influence caused by pixel unit array light-leakage c. Therefore, the affecting factor of Praw-Pdark-(Plight2-Pdark') includes the touch body pattern a and the pattern b of the display surface of the display device.

Thus, it is know that $$Pimage = \frac{Praw - Pdark - (Plight2 - Pdark')}{Plight1 - Plight2} = \frac{a+b}{a} = 1 + \frac{b}{a}.$$

The background interference signal is 1. At this moment, the fingerprint recognition module is not affected by the temperature fluctuation and has no moire. Therefore, after calibration, each frame of fingerprint image acquired by the fingerprint recognition module has the identical background interference signal during each fingerprint recognition process. Through the calibration of the fingerprint recognition unit, the influence on the fingerprint image caused by non-uniform background interference signals is eliminated and the calibrated fingerprint recognition module has a high fingerprint recognition accuracy. It should be noted that, 1 denotes the completely uniform background interference signal rather than the value of the background interference signal. It should be noted that the fingerprint recognition light signal at position a and the fingerprint recognition light signal at position b have the same moire distribution, so that the finally obtained image Pimage does not contain any factor that interferes with the fingerprint recognition.

In this embodiment, after the fingerprint recognition calibration, the fingerprint recognition module has a fixed background interference signal, so that any frame of fingerprint image is acquired by the fingerprint recognition module under the fixed background interference signal, a problem of inaccurate fingerprint image caused by non-uniform background interference signals is eliminated, and the calibrated fingerprint recognition unit makes the fingerprint recognition module has a high fingerprint recognition accuracy.

The difference from FIG. 4 is that, in one embodiment, the display panel does not display any image, the fingerprint recognition unit acquires the fingerprint data when the display surface of the display device is provided with a light-shielding substrate and takes this fingerprint data as the dark screen calibration fingerprint data dark'. The light-shielding substrate is in direct contact with the display surface of the display device. Alternatively, the light-shielding substrate and the display surface of the display device are spaced apart from each other by a first distance, and the first distance is greater than or equal to 10 micrometers and less than or equal to 10 centimeters. It should be noted that, in the initial calibration phase, when the reflection substrate, the black substrate and the light-shielding substrate are provided by time division to acquire the calibration fingerprint data, the reflection substrate, the black substrate and the light-shielding substrate provided by time division are in direct contact with the display surface of the display device; or, the reflection substrate, the black substrate and the light-shielding substrate provided by time division are not in direct contact with the display surface of the display device and spaced apart from the display surface of the display device by the first distance.

In one embodiment, a specific process of acquiring the dark screen fingerprint data dark and the bright screen fingerprint data raw by the fingerprint recognition unit includes: sequentially acquiring the dark screen fingerprint data dark and the bright screen fingerprint data raw by the fingerprint recognition unit in the first time length, where the first time length is less than or equal to 5 seconds.

Before the display panel displays the first image, the display panel does not display, and the fingerprint recognition unit acquires the dark screen fingerprint data dark. At this moment, the display device is not lightened, the display surface of the display device is shielded by the light-shielding substrate and the display device is not touched, and the fingerprint recognition unit in the display device generates the fingerprint data and the fingerprint data is the dark screen fingerprint data dark. Apparently, the dark screen fingerprint data dark is only associated with the temperature fluctuation d of fingerprint recognition module. In the fingerprint recognition phase, if the time interval between acquiring dark by the fingerprint recognition unit and acquiring raw by the fingerprint recognition unit is relatively long, it is still affected by the temperature fluctuation d of fingerprint recognition module. Based on this, in one embodiment, the time interval between acquiring dark by the fingerprint recognition unit and acquiring raw by the fingerprint recognition unit is relatively short, and the specific time interval is the first time length that is less than or equal to 5 seconds. Therefore, the temperature fluctuation d of fingerprint recognition module of raw and the temperature fluctuation d of fingerprint recognition module of dark are relatively small, and the fingerprint image of Praw-Pdark eliminates the influence of the temperature fluctuation d of fingerprint recognition module.

Embodiments of the present disclosure further provide a display device. The display device includes the display panel and the fingerprint recognition module. A light transmittable film is provided between the display panel and the fingerprint recognition module. The fingerprint recognition module includes a plurality of fingerprint recognition units. The display device further includes a fingerprint recognition calibration device. A calibration method of the fingerprint recognition calibration device includes: for any of the plurality of fingerprint recognition units, during an initial calibration, displaying a first image by the display panel and acquiring a bright screen calibration fingerprint data light' by the fingerprint recognition unit, and not displaying any image by the display panel and acquiring a dark screen calibration fingerprint data dark' by the fingerprint recognition unit; during a fingerprint recognition, displaying the first image by the display panel and acquiring a bright screen fingerprint data raw by the fingerprint recognition unit; performing calibration by the fingerprint recognition unit according to a calibration formula (1) to obtain a calibrated fingerprint recognition data image, $$\text{image} = \frac{\text{raw} - dark1}{light' - dark'}. \tag{1}$$

Dark1 is the dark screen calibration fingerprint data dark' acquired by the fingerprint recognition unit during the initial calibration and when the display panel does not display, or dark1 is a dark screen fingerprint data dark acquired by the fingerprint recognition unit during the fingerprint recognition and before the display panel displays the first image.

The fingerprint recognition calibration device in this embodiment is used for performing the fingerprint recognition calibration method in any of above embodiments, and the performing process is not repeated here. The fingerprint recognition calibration device in this embodiment may be integrated in a driving chip of the display device, and implemented by software and/or hardware.

Embodiments of the present disclosure further provide a display device. The display device includes the display panel and the fingerprint recognition module. A light transmittable film is provided between the display panel and the fingerprint recognition module. The fingerprint recognition module includes a plurality of fingerprint recognition units. The display device further includes a fingerprint recognition calibration device. A calibration method of the fingerprint recognition calibration device includes: for any of the plurality of fingerprint recognition units, during an initial calibration, displaying a first image by the display panel and acquiring a reflection calibration fingerprint data light1 by the fingerprint recognition unit; and displaying the first image by the display panel and acquiring a black calibration fingerprint data light2 by the fingerprint recognition unit; during a fingerprint recognition, displaying the first image by the display panel and acquiring a bright screen fingerprint data raw by the fingerprint recognition unit; and performing calibration by the fingerprint recognition unit according to a calibration formula (2) to obtain a calibrated fingerprint recognition data image, $$\text{image} = \frac{\text{raw} - light2}{light1 - light2}. \quad (2)$$

The fingerprint recognition calibration device in this embodiment is used for performing the fingerprint recognition calibration method in any of above embodiments, and the performing process is not repeated here. The fingerprint recognition calibration device in this embodiment may be integrated in a driving chip of the display device, and implemented by software and/or hardware.

Embodiments of the present disclosure further provide an electronic apparatus. The electronic apparatus includes the display device described in any above embodiment. In one embodiment, the display device is an organic light-emitting display device. The fingerprint recognition calibration method of the display device calibrates an acquired original image with the pre-measured calibration fingerprint data and image, thereby reducing the influence on the fingerprint recognition of non-uniformity such as moire.

It should be noted that the foregoing is only preferred embodiments of the present disclosure and its technical principles. It can be understood for those skilled in the art that the present disclosure is not limited to specific embodiments described herein. For those skilled in the art, the present disclosure may be subject to various apparent variations, readjustments and replacements without departing from a protection scope of the present disclosure. Therefore, although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:

1. A fingerprint recognition calibration method for a display device,
wherein the display device comprises a display panel and a fingerprint recognition module, wherein a light transmittable film is provided between the display panel and the fingerprint recognition module, wherein the fingerprint recognition module comprises a plurality of fingerprint recognition units,
wherein for each of the plurality of fingerprint recognition units, the fingerprint recognition calibration method for the display device comprises:
in an initial calibration phase, when the display device is lightened, displaying a first image by the display panel and acquiring a bright screen calibration fingerprint data light' by the fingerprint recognition unit based on a fingerprint recognition light signal reflected by a touch body;
then not displaying any image by the display panel when the display device is not lightened and is not touched, and a display surface of the display device is shielded by a light-shielding substrate, and acquiring a dark screen calibration fingerprint data dark' by the fingerprint recognition unit;
in a fingerprint recognition phase, when the display device is lightened, displaying the first image by the display panel and acquiring a bright screen fingerprint data raw by the fingerprint recognition unit; and
performing calibration on the bright screen fingerprint data raw by using a calibration formula (1) by the fingerprint recognition unit to obtain a calibrated fingerprint recognition data image, $$\text{image} = \frac{\text{raw} - dark1}{light' - dark'}, \quad (1)$$

wherein dark1 is one of the dark screen calibration fingerprint data dark' acquired by the fingerprint recognition unit when the display panel does not display any image in the initial calibration, and a dark screen fingerprint data dark is acquired by the fingerprint recognition unit before the display panel displays the first image.

2. The fingerprint recognition calibration method according to claim 1,
wherein a distance between the light-shielding substrate and the display surface of the display device is zero, or a first distance greater than or equal to 10 micrometers, or less than or equal to 10 centimeters.

3. The fingerprint recognition calibration method according to claim 2, wherein acquiring the bright screen calibration fingerprint data light' by the fingerprint recognition unit further comprises:
setting fingerprint data acquired by the fingerprint recognition unit to be the bright screen calibration fingerprint data light', wherein the fingerprint data is one of:
the fingerprint data reflected by a finger that is not in direct contact with the display surface of the display device;
the fingerprint data reflected by a finger that is in direct contact with the display surface of the display device, which is computed as an average value of the fingerprint data of the plurality of fingerprint recognition units; and
the fingerprint data reflected by a first touch body that is in direct contact with the display surface of the display device, wherein a standard reflectance of the first touch body is equal to that of the finger.

4. The fingerprint recognition calibration method according to claim 1, wherein in condition that the dark 1 is equal to the dark screen fingerprint data dark, the fingerprint recognition unit acquires the dark screen fingerprint data dark before the display panel displays the first image; and acquiring, by the fingerprint recognition unit, the dark screen fingerprint data dark and the bright screen fingerprint data raw comprises:

in a first time length, sequentially acquiring the dark screen fingerprint data dark and the bright screen fingerprint data raw by the fingerprint recognition unit, wherein the first time length is less than or equal to 5 seconds.

5. The fingerprint recognition calibration method according to claim 1, wherein in condition that the dark1 is equal to the dark screen calibration fingerprint data dark', the performing calibration by the fingerprint recognition unit according to the calibration formula (1) to obtain the calibrated fingerprint recognition data image comprises:

acquiring by the fingerprint recognition unit a difference between a finger ridge signal and a finger valley signal according to the bright screen fingerprint data raw, and when it is detected that the difference between the finger ridge signal and the finger valley signal is greater than or equal to a reference signal threshold, performing calibration by the fingerprint recognition unit according to the calibration formula (1) to obtain the calibrated fingerprint recognition data image.

6. The fingerprint recognition calibration method according to claim 5, wherein determining the reference signal threshold by the fingerprint recognition unit comprises:

when the display panel does not display any image and in the arrangement that the display surface of the display device is provided with the light-shielding substrate, acquiring by the fingerprint recognition unit a first reference fingerprint data when the display device is at a lowest application temperature T1; and acquiring by the fingerprint recognition unit a second reference fingerprint data when the display device is at a highest application temperature T2, where $-40°$ C.$\leq$T1$\leq$0° C. and 20° C.$\leq$T2$\leq$80° C.; and determining an absolute value of a difference between the first reference fingerprint data and the second reference fingerprint data as the reference signal threshold.

7. A fingerprint recognition calibration method for a display device, wherein the display device comprises a display panel and a fingerprint recognition module, wherein a light transmittable film is provided between the display panel and the fingerprint recognition module, wherein the fingerprint recognition module comprises a plurality of fingerprint recognition units, and wherein for each of the plurality of fingerprint recognition units, a fingerprint recognition calibration of the display panel comprises:

in an initial calibration phase, when the display device is lightened and is not touched, displaying a first image by the display panel and-acquiring a reflection calibration fingerprint data light1 by the fingerprint recognition unit based on a fingerprint recognition light signal reflected by a reflection substrate disposed on a display surface of the display device, wherein the first image is either a red image or a green image;

displaying the first image by the display panel when the display device is lightened and is not touched, and acquiring a black calibration fingerprint data light2 by the fingerprint recognition unit based on a fingerprint recognition light signal reflected by a black substrate disposed on a display surface of the display panel; and not displaying any image by the display panel when the display device is lightened and is not touched, and a display surface of the display device is shielded by a light-shielding substrate, and acquiring a dark screen calibration fingerprint data dark' by the fingerprint recognition unit;

in a fingerprint recognition phase, when the display device is lightened, displaying the first image by the display panel and acquiring a bright screen fingerprint data raw by the fingerprint recognition unit; and acquiring a dark screen fingerprint data dark by fingerprint recognition unit the before the display panel displays the first image when the display device is lightened and is not touched, and a display surface of the display device is shielded by a light-shielding substrate; and performing calibration on the bright screen fingerprint data raw by using a calibration formula (3) by the fingerprint recognition unit to obtain a calibrated fingerprint recognition data image, wherein the calibrated fingerprint recognition data image is data obtained after the bright screen fingerprint data raw is calibrated.

$$\text{image} = \frac{\text{raw} - \text{dark} - (\text{light2} - \text{dark}')}{\text{light1} - \text{light2}}. \qquad (3)$$

8. The fingerprint recognition calibration method according to claim 7, wherein when the fingerprint recognition unit acquires the reflection calibration fingerprint data light1, a distance between the reflection substrate and the display surface of the display device is zero or a first distance, and when the fingerprint recognition unit acquires the black calibration fingerprint data light2, a distance between the black substrate and the display surface of the display device is zero or a first distance;

wherein the first distance is greater than or equal to 10 micrometers or less than or equal to 10 centimeters.

9. The fingerprint recognition calibration method according to claim 8, wherein the performing calibration on the bright screen fingerprint data raw by using the calibration formula (3) by the fingerprint recognition unit to obtain a calibrated fingerprint recognition data image comprises:

acquiring by the fingerprint recognition unit a difference between a finger ridge signal and a finger valley signal according to the bright screen fingerprint data raw, and when it is detected that the difference between the finger ridge signal and the finger valley signal is greater than or equal to a reference signal threshold, performing calibration on the bright screen fingerprint data raw by the fingerprint recognition unit according to the calibration formula (3) to obtain the calibrated fingerprint recognition data image.

10. The fingerprint recognition calibration method according to claim 9, wherein the determining the reference signal threshold by the fingerprint recognition unit comprises:

when the display panel does not display any image and in the arrangement that the display surface of the display device is provided with a light-shielding substrate, acquiring by the fingerprint recognition unit a first reference fingerprint data when the display device is at a lowest application temperature T1; and acquiring by the fingerprint recognition unit a second reference fingerprint data when the display device is at a highest application temperature T2, where $-40°$ C.$\leq$T1$\leq$0° C. and 20° C.$\leq$T2$\leq$80° C.; and determining an absolute value of a difference between the first reference fingerprint data and the second reference fingerprint data as the reference signal threshold.

11. The fingerprint recognition calibration method according to claim 8,
wherein the display panel does not display any image, a fingerprint data is acquired by the fingerprint recognition unit in an arrangement that the display surface of the display device is provided with the light-shielding substrate and the fingerprint data is taken as the dark screen calibration fingerprint data dark', and
wherein a distance between the light-shielding substrate and the display surface of the display device is zero or a first distance greater than or equal to 10 micrometers or less than or equal to 10 centimeters.

12. The fingerprint recognition calibration method according to claim 8, wherein the acquiring the dark screen fingerprint data dark and the bright screen fingerprint data raw by the fingerprint recognition unit comprises:
in a first time length, sequentially acquiring the dark screen fingerprint data dark and the bright screen fingerprint data raw by the fingerprint recognition unit, wherein the first time length is less than or equal to 5 seconds.

13. A display device, comprising:
a display panel;
a fingerprint recognition module comprising a plurality of fingerprint recognition units;
a light transmittable film provided between the display panel and the fingerprint recognition module; and
a fingerprint recognition calibration device,
wherein for each of the plurality of fingerprint recognition units, a calibration method of the fingerprint recognition calibration device comprises:
in an initial calibration phase, when the display device is lightened, displaying a first image by the display panel and acquiring a bright screen calibration fingerprint data light' by the fingerprint recognition unit based on a fingerprint recognition light signal reflected by a touch body; then not displaying any image by the display panel when the display device is not lightened and is not touched and a display surface of the display device is shielded by a light-shielding substrate, and acquiring a dark screen calibration fingerprint data dark' by the fingerprint recognition unit;
in a fingerprint recognition phase, displaying the first image by the display panel when the display device is lightened and acquiring a bright screen fingerprint data raw by the fingerprint recognition unit; and
performing calibration on the bright screen fingerprint data raw by using a calibration formula (1) by the fingerprint recognition unit to obtain a calibrated fingerprint recognition data image, $$image = \frac{raw - dark1}{light' - dark'}, \quad (1)$$

wherein dark1 is one of the dark screen calibration fingerprint data dark' acquired by the fingerprint recognition unit when the display panel does not display any image in the initial calibration, and a dark screen fingerprint data dark is acquired by the fingerprint recognition unit before the display panel displays the first image.

14. A display device, comprising:
a display panel;
a fingerprint recognition module comprising a plurality of fingerprint recognition units;
a light transmittable film provided between the display panel and the fingerprint recognition module; and
a fingerprint recognition calibration device,
wherein for each of the plurality of fingerprint recognition units, a calibration method of the fingerprint recognition calibration device comprises:
in an initial calibration phase, when the display device is lightened and is not touched, displaying a first image by the display panel, and acquiring a reflection calibration fingerprint data light1 by the fingerprint recognition unit based on a fingerprint recognition light signal reflected by a reflection substrate disposed on a display surface of the display device, wherein the first image is one of a red image and a green image;
when the display device is lightened and is not touched, displaying the first image by the display panel and acquiring a black calibration fingerprint data light2 by the fingerprint recognition unit based on a fingerprint recognition light signal reflected by a black substrate disposed on a display surface of the display panel; and
when the display device is lightened and is not touched, and a display surface of the display device is shielded by a light-shielding substrate, not displaying any image by the display panel, and acquiring a dark screen calibration fingerprint data dark' by the fingerprint recognition unit;
in a fingerprint recognition phase, when the display device is lightened, displaying the first image by the display panel, acquiring a bright screen fingerprint data raw by the fingerprint recognition unit; and acquiring a dark screen fingerprint data dark by fingerprint recognition unit the before the display panel displays the first image when the display device is lightened and is not touched, and a display surface of the display device is shielded by a light-shielding substrate;
and
performing calibration on the bright screen fingerprint data raw by using a calibration formula (3) by the fingerprint recognition unit to obtain a calibrated fingerprint recognition data image, wherein the calibrated fingerprint recognition data image is data obtained after the bright screen fingerprint data raw is calibrated $$image = \frac{raw - dark - (light2 - dark')}{light1 - light2}. \quad (3)$$

15. An electronic apparatus, comprising the display device according to claim 13.

16. The electronic apparatus according to claim 15, wherein the display device is an organic light-emitting display device.

17. An electronic apparatus, comprising the display device according to claim 14.

* * * * *